(12) United States Patent
Chen et al.

(10) Patent No.: US 12,249,737 B2
(45) Date of Patent: Mar. 11, 2025

(54) LITHIUM BATTERY CELL AND MANUFACTURING METHOD THEREOF

(71) Applicant: DELTA ELECTRONICS, INC., Taoyuan (TW)

(72) Inventors: Cheng-Huang Chen, Taoyuan (TW); Yi-Hsiang Chan, Taoyuan (TW); Shu-Lin Chen, Taoyuan (TW); Wei-En Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 51 days.

(21) Appl. No.: 17/445,950

(22) Filed: Aug. 25, 2021

(65) Prior Publication Data

US 2022/0328939 A1 Oct. 13, 2022

(30) Foreign Application Priority Data

Apr. 7, 2021 (TW) ................................. 110203703

(51) Int. Cl.
*H01M 50/536* (2021.01)
*H01M 10/0525* (2010.01)
(Continued)

(52) U.S. Cl.
CPC ..... *H01M 50/536* (2021.01); *H01M 10/0525* (2013.01); *H01M 10/0583* (2013.01); *H01M 50/534* (2021.01); *H01M 50/566* (2021.01)

(58) Field of Classification Search
CPC ........... H01M 10/0583; H01M 50/536; H01M 50/533; H01M 50/528; H01M 50/54
(Continued)

(56) References Cited

U.S. PATENT DOCUMENTS 9,728,787 B2 8/2017 Shinto et al.
2004/0028999 A1* 2/2004 Richard .............. H01M 50/534
429/149
(Continued)

FOREIGN PATENT DOCUMENTS

CN 202712317 U 1/2013
CN 202930467 U 5/2013
(Continued)

OTHER PUBLICATIONS

Machine translation of CN-109698309-B appended to the original document.*

*Primary Examiner* — Sadie White
*Assistant Examiner* — Kayla Elaine Clary
(74) *Attorney, Agent, or Firm* — CKC & Partners Co., LLC

(57) ABSTRACT

A lithium battery cell includes an upper cover module, a first battery electrode group, a second battery electrode group, and a plurality of first electrode connection straps. The first electrode connection straps are stacked together and have the same width and length. A first end of the first electrode connection straps is welded to a first tab, a second end of the first electrode connection straps is welded to a second tab, and a middle part of the first electrode connection straps is welded to a first electrode terminal. An even number of first bending parts are formed between the middle part and the first end, and an even number of second bending parts are formed between the middle part and the second end, and the first bending parts and the second bending parts are symmetrical to each other. Furthermore, a lithium battery cell manufacturing method is also disclosed therein.

11 Claims, 8 Drawing Sheets

(51) Int. Cl.
   *H01M 10/0583*   (2010.01)
   *H01M 50/534*   (2021.01)
   *H01M 50/566*   (2021.01)
(58) Field of Classification Search
   USPC ........................................................ 429/163
   See application file for complete search history.

(56) References Cited

U.S. PATENT DOCUMENTS

2007/0134551 A1\* 6/2007 Cyr ..................... H01M 50/533
                                                          429/160
2017/0062792 A1\* 3/2017 Baik .................. H01M 50/536

FOREIGN PATENT DOCUMENTS

| CN | 102629678 B | | 5/2016 | |
|---|---|---|---|---|
| CN | 108232095 A | | 6/2018 | |
| CN | 207818809 U | | 9/2018 | |
| CN | 207938702 U | | 10/2018 | |
| CN | 209282294 U | | 8/2019 | |
| CN | 210052815 U | | 2/2020 | |
| CN | 109698309 B | \* | 7/2022 | ........ H01M 10/0525 |
| JP | 4494731 B2 | | 6/2010 | |
| JP | 2014154272 A | | 8/2014 | |

\* cited by examiner

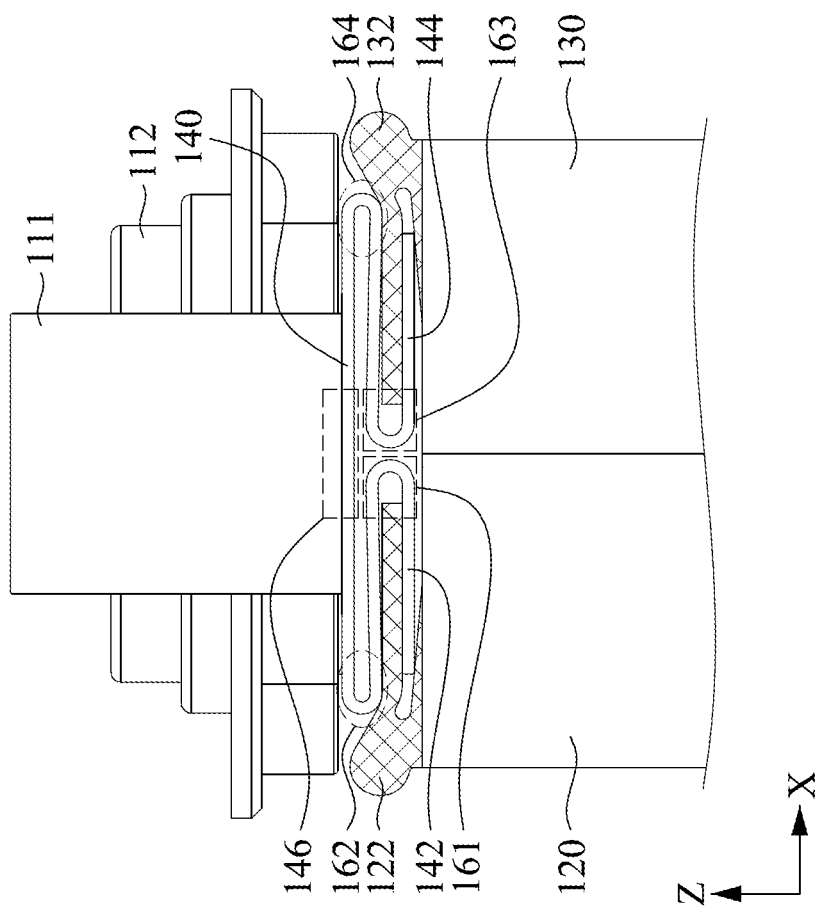
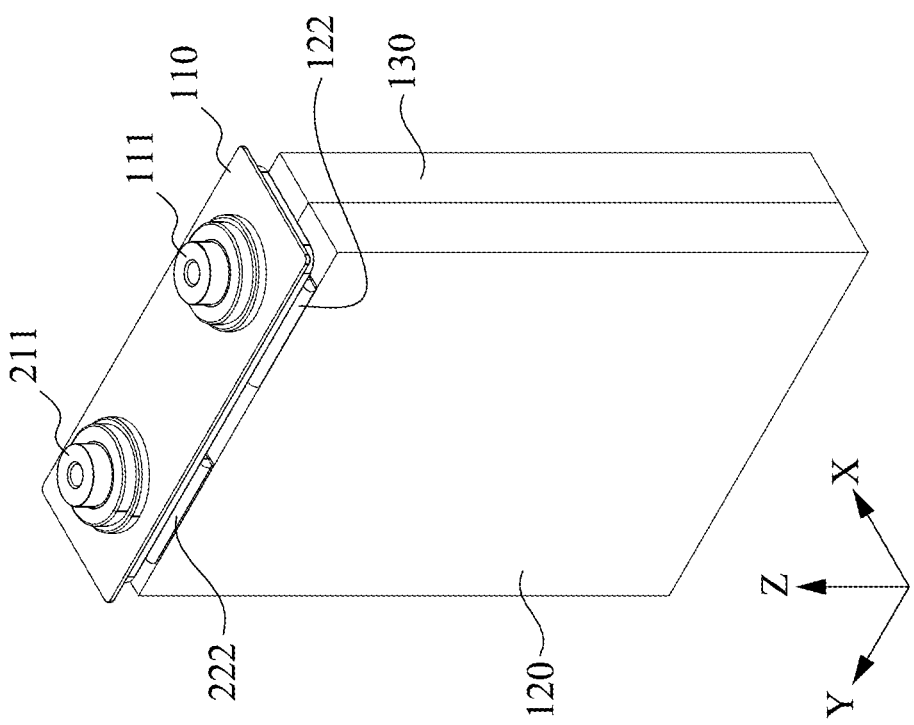
Fig. 7B
Fig. 7A

LITHIUM BATTERY CELL AND MANUFACTURING METHOD THEREOF

RELATED APPLICATIONS

This application claims priority to Taiwan Application Serial Number 110203703, filed Apr. 7, 2021, the disclosures of which are incorporated herein by reference in their entireties.

TECHNICAL FIELD

The present disclosure generally relates to a battery cell and a manufacturing method thereof. More particularly, the present disclosure relates to a lithium battery cell and a lithium battery cell manufacturing method.

BACKGROUND

With the development of science and technology, portable electronic devices have been widely used in daily life. Secondary lithium batteries are moving towards high energy density, and are widely used in portable electronic devices, such as smart phones or the like. In recent years, with the miniaturization and weight reduction of mobile devices, the outer packaging materials of lithium secondary batteries are also required to be thin and light, and can be applied to different battery sizes. Therefore, the traditional metal can has been replaced by a composite packaging material to produce pouch cell lithium batteries in order to cut down the weight of the lithium batteries.

In the lithium battery cell, the connection straps connected the electrode group to the terminal head are more complicated and longer, and some of the connection straps are too complicated to be unfavorable for the production process. In addition, if the length of the connection strap is too long, the raised resistance of the connection strap is harmful to high-power lithium batteries.

Furthermore, referring to FIG. 8, when the connection strap 920, a stack form of the plurality of the straps, are bent, the length of the connection straps 920 adjacent to the inner side of the bending part 930 requires a shorter length of the connection straps 920, and the length of the connection straps 920 adjacent to the outer side of the bending part 930 requires a longer length of the connection straps 920. That is to say, when the same length connection straps 920 are bent, wrinkles 910 may therefore be formed thereon, so as to reduce the quality of the lithium battery.

Furthermore, in the lithium battery, because different electrode groups are welded with different length connection straps, various types of connection straps have to be prepared. Since various types of connection straps have to be prepared, it will increase the complexity of material preparation and also lead to an increase in the usage and stock of the materials for manufacturing the connection straps, and further increase the complexity of the manufacturing process of lithium batteries.

SUMMARY

One objective of the embodiments of the present invention is to provide a lithium battery cell able to reduce the wrinkles of the connection straps and improve the production quality of lithium batteries.

To achieve these and other advantages and in accordance with the objective of the embodiments of the present invention, as the embodiment broadly describes herein, the embodiments of the present invention provide a lithium battery cell including an upper cover module, a first battery electrode group, a second battery electrode group and a plurality of first electrode connection straps. The upper cover module has a first electrode terminal, the first battery electrode group has a first tab, and the second battery electrode group has a second tab. The first electrode connection straps are stacked together and have the same width and length. In addition, a first end of the first electrode connection straps is electrical connected, by welding, to the first tab, a second end of the first electrode connection straps is electrical connected, by welding, to the second tab, and a middle part of the first electrode connection straps is electrical connected, by welding, to the first electrode terminal. The first electrode connection straps have an even number of first bending parts from the middle part to the first end, the first electrode connection straps have an even number of second bending parts from the middle part to the second end, and the first bending parts and the second bending parts are symmetrical to each other.

In some embodiments, the upper cover module further includes an upper covering plate, an upper insulation ring and a lower insulation ring. The upper insulation ring is disposed on the upper covering plate and the lower insulation ring is disposed under the upper covering plate. The upper insulation ring and the lower insulation ring fix the first electrode terminal in the upper covering plate, and electrically isolate the first electrode terminal from the upper covering plate.

In some embodiments, the first electrode terminal is a positive electrode terminal and the first electrode connection straps include a plurality of aluminum electrode connection straps.

In some embodiments, the first electrode terminal is a negative electrode terminal and the first electrode connection straps include a plurality of copper electrode connection straps.

In some embodiments, the lithium battery cell further includes a housing fixed to the upper covering plate of the upper cover module to seal the first battery electrode group and the second battery electrode group.

In some embodiments, the housing includes a metal housing laser welded to the upper covering plate of the upper cover module.

In some embodiments, the housing includes an aluminum housing.

In some embodiments, the first bending parts include a first U-shaped bending part and a second U-shaped bending part, the first U-shaped bending part is disposed on both sides of the first tab, the second U-shaped bending part is connected to the first U-shaped bending part, and the first U-shaped bending part is arranged opposite to the second U-shaped bending part.

According to another aspect of the present invention, the embodiments of the present invention provide a lithium battery cell manufacturing method including the following steps. A plurality of first electrode connection straps are provided, the first electrode connection straps include a first end, a second end and a middle part, and the first electrode connection straps have the same width and length. The first electrode connection straps are stacked together. A first battery electrode group is provided and the first battery electrode group includes a first tab. A second battery electrode group is provided and the second battery electrode group includes a second tab. The first end of the first electrode connection straps is electrical connected, by welding, to the first tab, and the second end of the first electrode connection straps is electrical connected, by welding, to the second tab. An upper cover module is provided and includes a first electrode terminal. The middle part of the first electrode connection straps is welded on the first electrode terminal. The first electrode connection straps, from the middle part to the first end, and the first electrode connection straps, from the middle part to the second end, are symmetrically bended as a center on the first electrode terminal. The first electrode connection straps, from the middle part to the first end, and the first electrode connection straps, from the middle part to the second end, are symmetrically bended again to fold the first electrode connection straps. The first electrode connection straps have an even number of first bending parts from the middle part to the first end, the first electrode connection straps have an even number of second bending parts from the middle part to the second end, and the first bending parts and the second bending parts are symmetrical to each other.

In some embodiments, the step of welding the first end of the first electrode connection straps to the first tab and welding the second end of the first electrode connection straps to the second tab is performed by an ultrasonic welding.

In some embodiments, the step of welding the middle part of the first electrode connection straps to the first electrode terminal is performed by a laser welding.

In some embodiments, the upper cover module further includes an upper covering plate, an upper insulation ring and a lower insulation ring. The upper insulation ring is disposed on the upper covering plate and the lower insulation ring is disposed under the upper covering plate. The upper insulation ring and the lower insulation ring fix the first electrode terminal in the upper covering plate, and electrically isolate the first electrode terminal from the upper covering plate.

In some embodiments, the lithium battery cell manufacturing method further includes the step of laser welding the upper covering plate to a housing to seal the first battery electrode group and the second battery electrode group.

In some embodiments, the housing includes a metal housing, for example, an aluminum housing.

In some embodiments, the first bending parts include a first U-shaped bending part and a second U-shaped bending part, the first U-shaped bending part is disposed on both sides of the first tab, the second U-shaped bending part is connected to the first U-shaped bending part, and the first U-shaped bending part is arranged opposite to the second U-shaped bending part.

In some embodiments, the first electrode terminal is a positive electrode terminal and the first electrode connection straps include a plurality of aluminum electrode connection straps.

In some embodiments, the first electrode terminal is a negative electrode terminal and the first electrode connection straps include a plurality of copper electrode connection straps.

Hence, the lithium battery cell and manufacturing method thereof can effectively avoid the wrinkle formed on the electrode connection straps, reduce the amount of material of the electrode connection belt, reduce the material inventory in the storage, simplify the manufacturing process and improve the production quality of the lithium battery.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 2 to FIGS. 7A and 7B illustrate manufacturing processes of a lithium battery cell manufacturing method according to one embodiment of the present invention.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
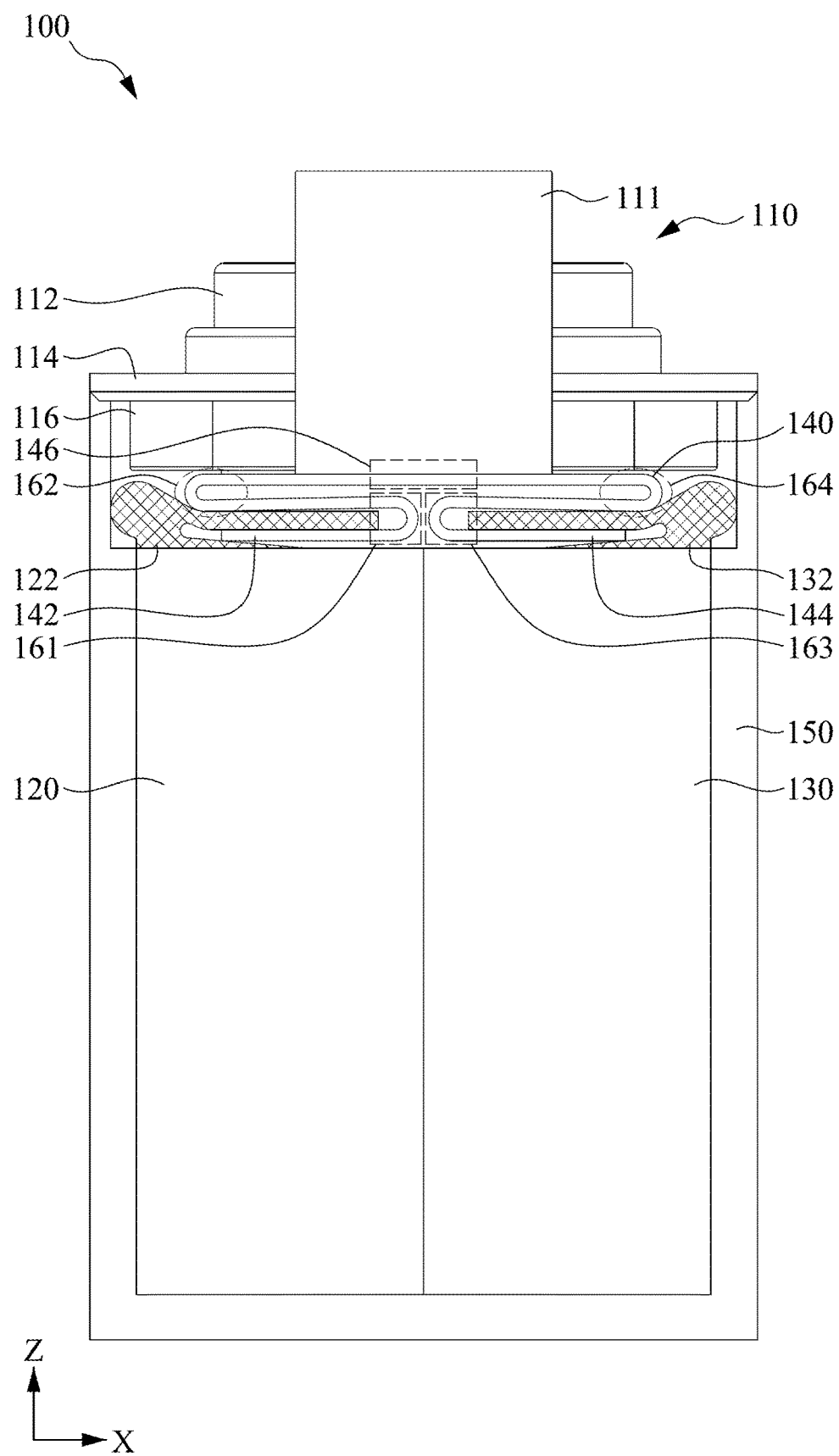
FIG. 1 illustrates a schematic cross-sectional side view showing a lithium battery cell according to one embodiment of the present invention.

FIG. 1 is a schematic cross-sectional side view showing a lithium battery cell, and FIG. 2 to FIGS. 7A and 7B illustrate manufacturing processes of a lithium battery cell manufacturing method. Referring to FIG. 1, a lithium battery cell 100 includes an upper cover module 110, a first battery electrode group 120, a second battery electrode group 130 and a plurality of first electrode connection straps 140. The upper cover module 110 includes a first electrode terminal 111, an upper covering plate 114, an upper insulation ring 112 and a lower insulation ring 116.

The upper insulation ring 112 is disposed on the upper covering plate 114, and the lower insulation ring 116 is disposed under the upper covering plate 114. The upper insulation ring 112 and the lower insulation ring 116 fix the first electrode terminal 111 in the upper covering plate 114 to electrically isolate the first electrode terminal 111 from the upper covering plate 114.

In addition, the first battery electrode group 120 includes a first tab 122, and the second battery electrode group 130 includes a second tab 132. The first tab 122 and the second tab 132 are electrically connected to the first electrode connection straps 140. It is worth noting that a plurality of first electrode connection straps 140 are stacked together and have the same width and length. The figure shows the first electrode connection straps 140 formed a stacked type. That is to say, a plurality of first electrode connection straps 140 have approximately the same area or a plurality of first electrode connection straps 140 have the same resistance so as to allow the two battery electrode groups connected to the electrode terminal have the same resistance, thereby smoothly and stably outputting a power by the lithium battery cell 100.

The first electrode connection straps 140 include a first end 142, a second end 144 and a middle part 146 disposed between the first and second ends 142, 144. The first end 142 of the first electrode connection straps 140 is welded to the first tab 122, and the second end 144 of the first electrode connection straps 140 is welded to the second tab 132. The middle part 146 of the first electrode connection straps 140 is welded to the first electrode terminal 111. Therefore, the first tab 122 and the second tab 132 can electrically connect to the first electrode terminal 111 by the first electrode connection straps 140.

Furthermore, at the path from the middle part 146 to the first end 142, the first electrode connection straps 140 includes an even number of first bending parts, for example, a first bending part 161 and a first bending part 162. In addition, at the path from the middle part 146 to the second end 144, the first electrode connection straps 140 includes an even number of second bending parts, for example, a second bending part 163 and a second bending part 164, the first bending part 161 and the second bending part 163 are symmetrical to each other, and the first bending part 162 and the second bending part 164 are symmetrical to each other.

In some embodiments, the first bending part 161 is a first U-shaped bending part, and the first bending part 162 is a second U-shaped bending part, the first U-shaped bending part is disposed near the first tab 122, the second U-shaped bending part is connected to the first U-shaped bending part, and the first U-shaped bending part is arranged opposite to the second U-shaped bending part. The electrical connection of first electrode connection straps 140, from the first end 142 to the middle part 146, passes the two first bending parts 161, 162.

In some embodiments, the second bending part 163 is another one first U-shaped bending part, and the second bending part 164 is another one second U-shaped bending part, the another one first U-shaped bending part is disposed on both sides of the second tab 132, the another one second U-shaped bending part is connected to the another one first U-shaped bending part, and the another one first U-shaped bending part is arranged opposite to the another one second U-shaped bending part. The electrical connection of first electrode connection straps 140, from the second end 144 to the middle part 146, passes the two second bending parts 163, 164.

In some embodiments, the first electrode terminal 111 is a positive electrode terminal or a negative electrode terminal.

In some embodiments, when the first electrode terminal 111 is a positive electrode terminal, the first electrode connection straps 140 shows a stack with a plurality of aluminum electrode connection straps. In addition, the first electrode terminal 111 is an aluminum electrode terminal.

In some embodiments, when the first electrode terminal 111 is a negative electrode terminal, the first electrode connection straps 140 comprise a plurality of copper electrode connection straps. In addition, the first electrode terminal 111 is a copper electrode terminal.

In some embodiments, the lithium battery cell 100 further comprises a housing 150, be fixed to the upper covering plate 114 of the upper cover module 110, to seal the first battery electrode group 120 and the second battery electrode group 130.

In some embodiments, the housing 150 is a metal housing, for example, an aluminum housing, to be fixed to the upper covering plate 114 of the upper cover module 110 by laser welding.

Figure 2:
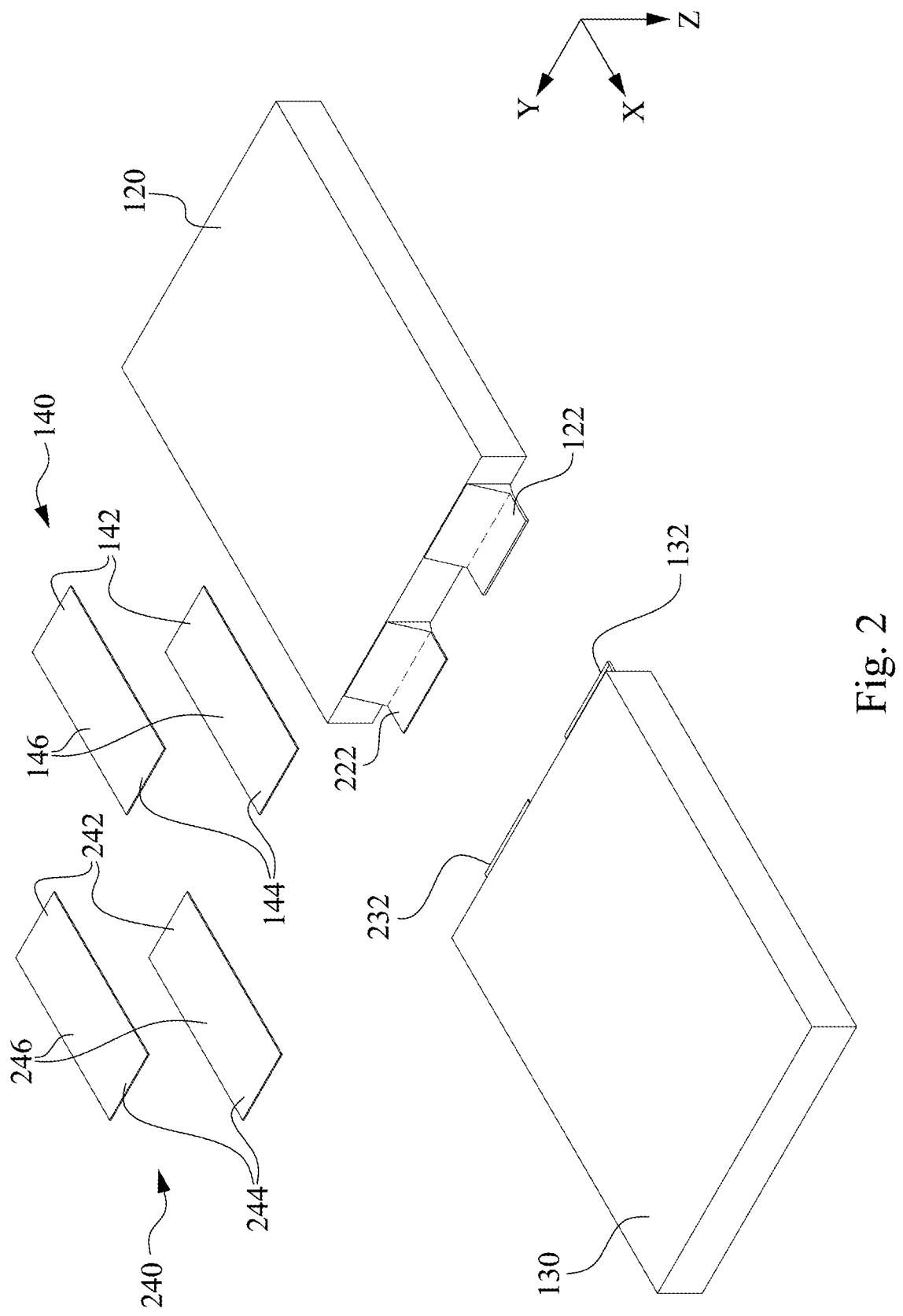

Further referring to FIG. 2 to FIGS. 7A and 7B, a lithium battery cell manufacturing method is disclosed. First, as shown in FIG. 2, a plurality of first electrode connection straps 140 are provided and stacked together. The first electrode connection straps 140 have the same width and length, and the first electrode connection straps 140 include a first end 142, a second end 144 and a middle part 146. The first electrode connection straps 140 can have the same resistance value since the first electrode connection straps 140 having the same width and length, i.e. a same area, and stacking together.

Furthermore, in the lithium battery cell manufacturing method, a first battery electrode group 120 and a second battery electrode group 130 are provided, the first battery electrode group 120 includes a first tab 122 extending from electrode sheets of the first battery electrode group 120, and the second battery electrode group 130 includes a second tab 132 extending from electrode sheets of the second battery electrode group 130.

The first battery electrode group 120 further includes a third tab 222, and the second battery electrode group 130 further includes a fourth tab 232. In addition, a plurality of second electrode connection straps 240 are stacked together. The second electrode connection straps 240 have the same width and length, and the second electrode connection straps 240 include a first end 242, a second end 244 and a middle part 246. When the first electrode connection straps 140 are positive, the second electrode connection straps 240 are negative. When the first electrode connection straps 140 are negative, the second electrode connection straps 240 are positive. The following description mainly focuses on the manufacturing process of the first electrode connection straps 140, while a part of the description is supplemented by the manufacturing process of the second electrode connection straps 240.

In some embodiments, the first battery electrode group 120 is formed by alternately stacking a plurality of aluminum electrode sheets and copper electrode sheets, and the second battery electrode group 130 is formed by a similar structure. When the first electrode terminal 111 is positive, a plurality of aluminum electrode sheets of the first battery electrode group 120 and the second battery electrode group 130 respectively stack and extend to form the first tab 122 and the second tab 132, and a plurality of copper electrode sheets of the first battery electrode group 120 and the second battery electrode group 130 respectively stack and extend to form the third tab 222 and the fourth tab 232.

Figure 3:
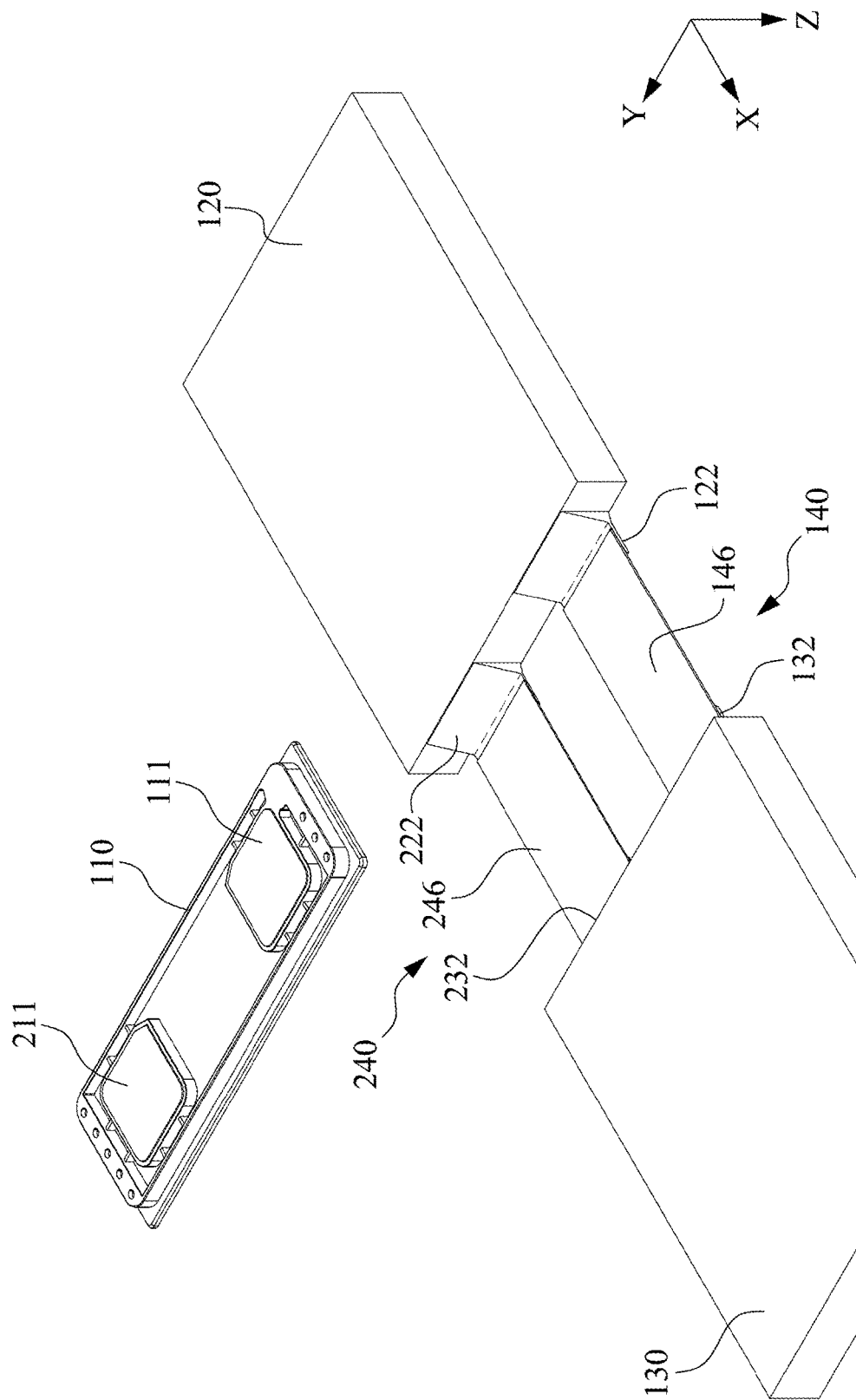

Referring to FIGS. 2 and 3, the first end 142 of first electrode connection straps 140 is welded to the first tab 122, and the second end 144 of the first electrode connection straps 140 is welded to the second tab 132. Meanwhile, the first end 242 of the second electrode connection straps 240 is welded to the third tab 222, and the second end 244 of the second electrode connection straps 240 is welded to the fourth tab 232.

In some embodiments, the lithium battery cell manufacturing method further utilizes an ultrasonic welding to weld the first end 142 of first electrode connection straps 140 on the first tab 122, and to weld the second end 144 of the first electrode connection straps 140 on the second tab 132. Meanwhile, the lithium battery cell manufacturing method further utilizes an ultrasonic welding to weld the first end of 242 of the second electrode connection straps 240 on the third tab 222, and to weld the second end 244 of the second electrode connection straps 240 on the fourth tab 232. In addition, an upper cover module 110 is further provided, and the upper cover module 110 includes a first electrode terminal 111 and a second electrode terminal 211.

Figure 4:
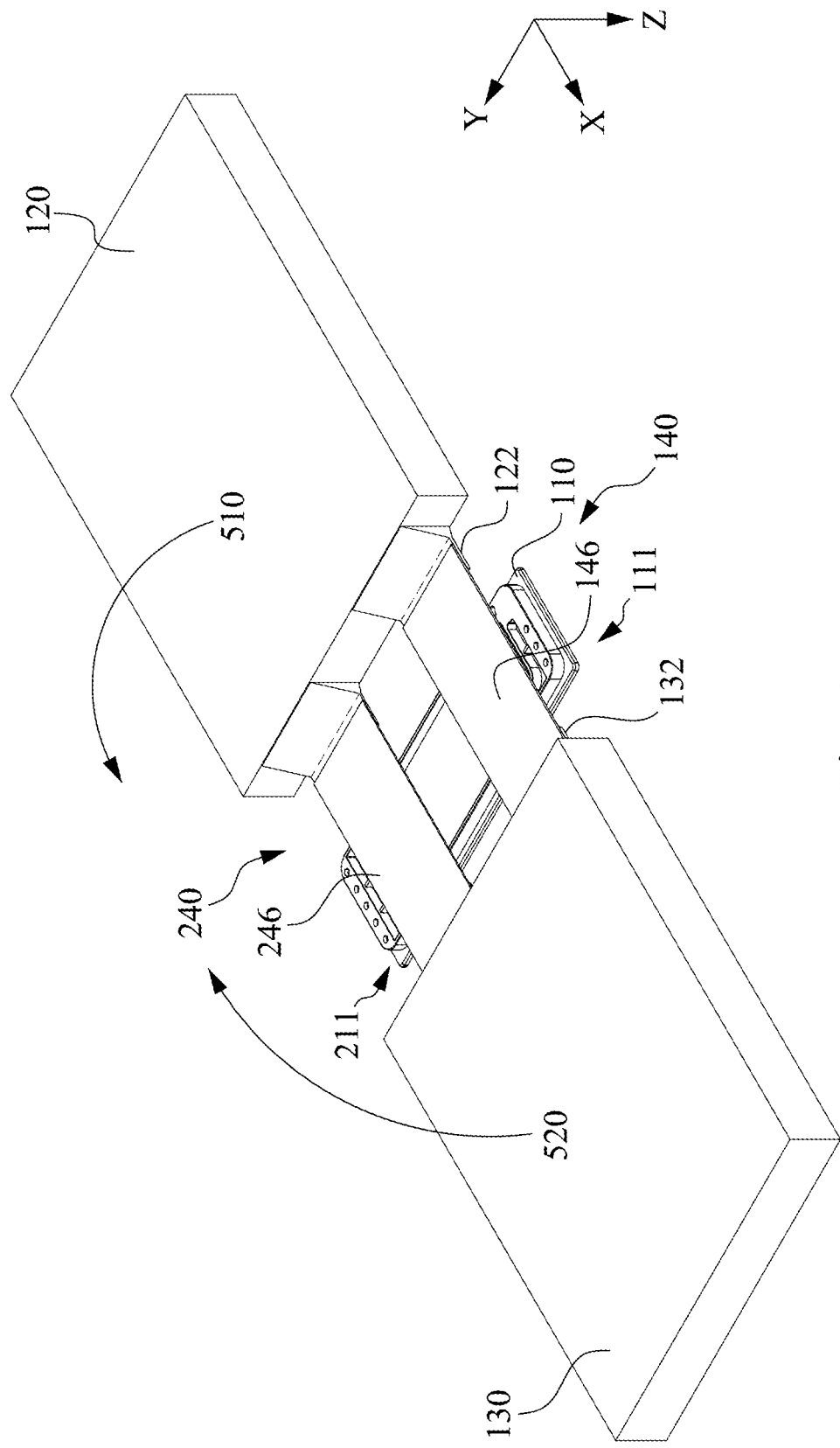

Referring to FIGS. 3 and 4, the middle part 146 of the first electrode connection straps 140 is welded to the first electrode terminal 111, and the middle part 246 of the second electrode connection straps 240 is welded to the second electrode terminal 211. Therefore, the upper cover module 110 is approximately located between the first battery electrode group 120 and the second battery electrode group 130. In some embodiments, the length, from the first electrode terminal 111 to the first tab 122, of the first electrode connection straps 140 approximately equals to the length, from the first electrode terminal 111 to the second tab 132, of the first electrode connection straps 140. In addition, the length, from the second electrode terminal 211 to the third tab 222, of the second electrode connection straps 240 approximately equals to the length, from the second electrode terminal 211 to the fourth tab 232, of second electrode connection straps 240.

In some embodiments, the lithium battery cell manufacturing method utilizes a laser welding to weld the middle part 146 of the first electrode connection straps 140 on the first electrode terminal 111, and the middle part 246 of the second electrode connection straps 240 on the second electrode terminal 211.

Figure 5:
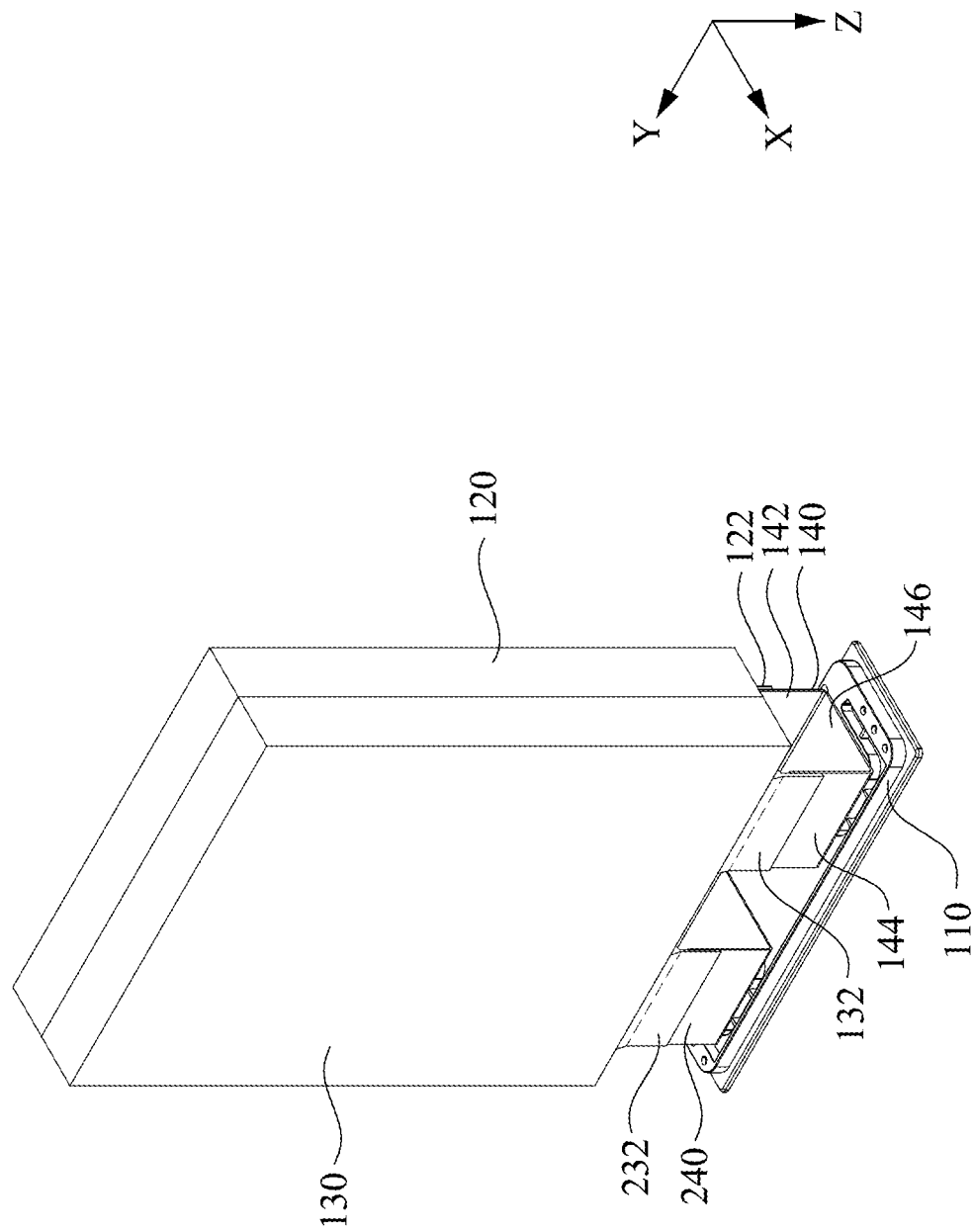

Continuously referring to FIGS. 4 and 5, along the arrow direction 510 and the arrow direction 520, the first electrode connection straps 140, from the middle part 146 to the first end 142, and the first electrode connection straps 140, from the middle part 146 to the second end 144, are symmetrically bent as a center on the first electrode terminal 111. Similarly, along the arrow direction 510 and the arrow direction 520, the second electrode connection straps 240 are symmetrically bent as a center on the second terminal 211. A lithium battery cell structure with the forementioned bended electrode connection straps is shown in FIG. 5.

Figure 6B:
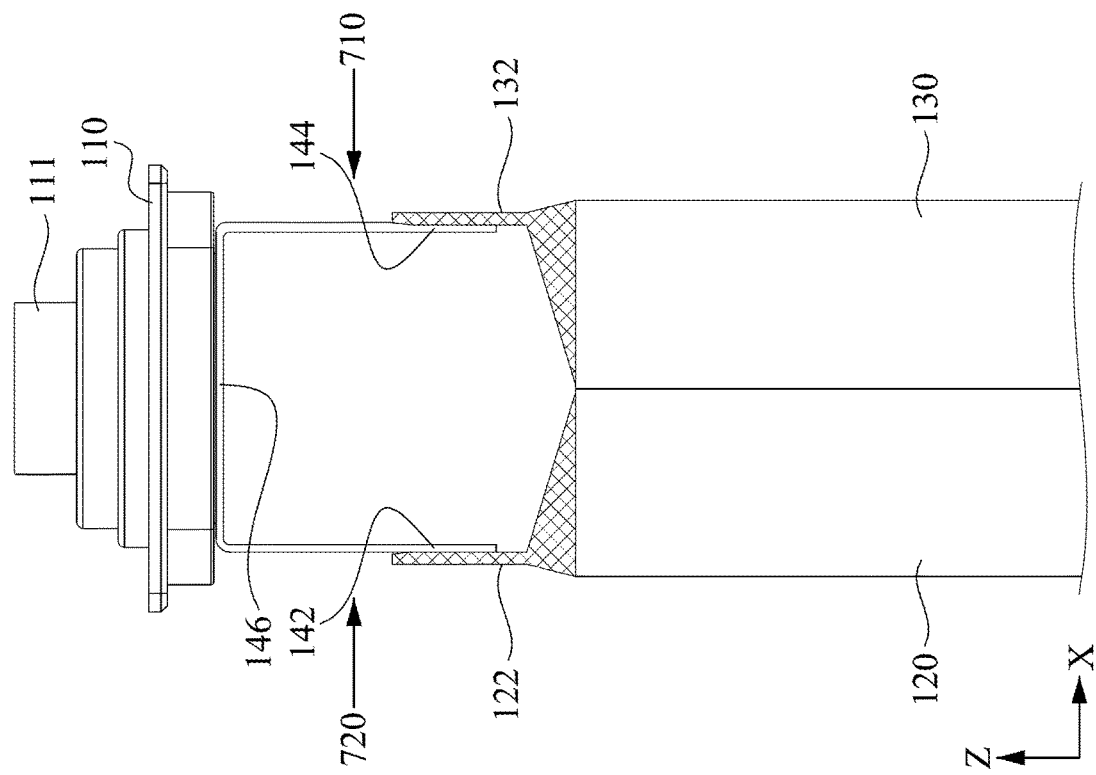
Figure 6A:
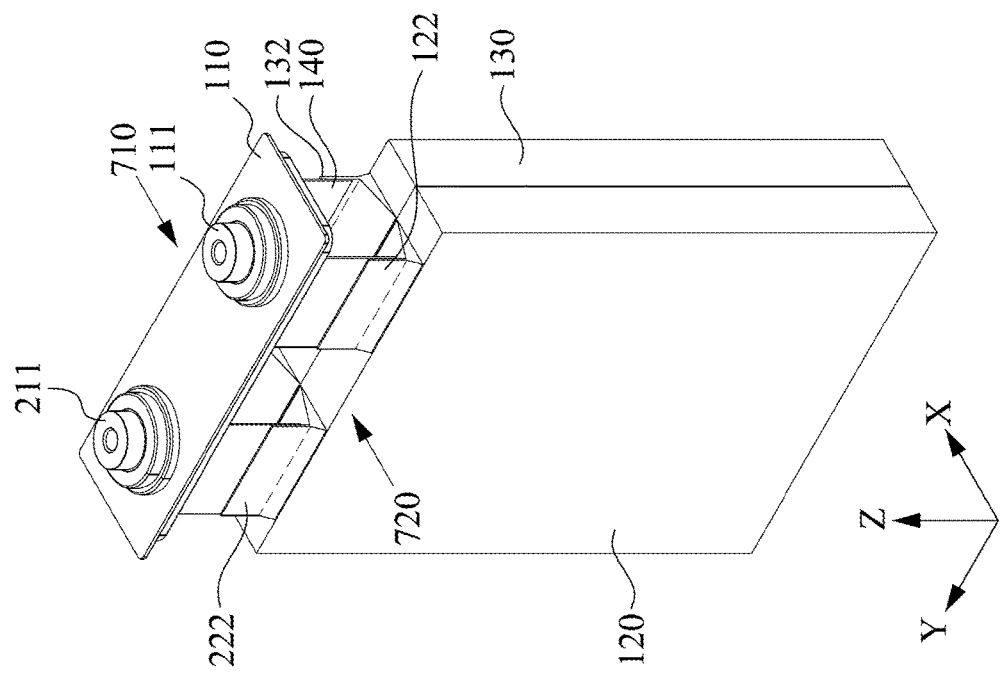
Figure 8:
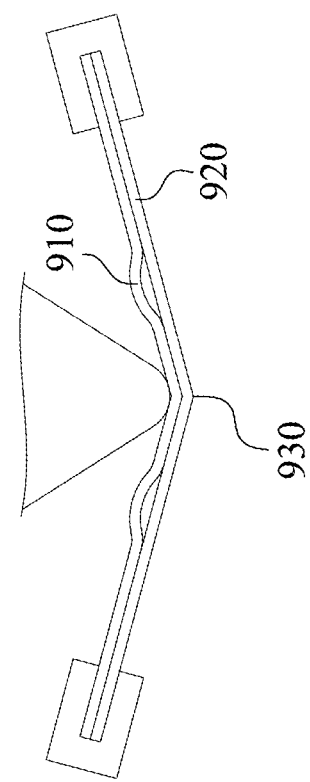
FIG. 8 is a schematic diagram of a wrinkle phenomenon caused by bending conventional lithium battery connection straps.
Figure 8:
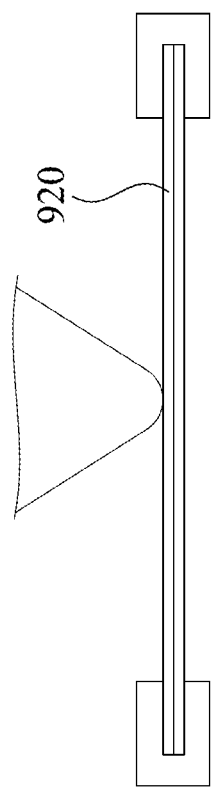

Continuously referring to FIGS. 6A and 6B, FIG. 6A is a perspective diagram showing a semi-finished structure of the lithium battery cell and FIG. 6B is a side view thereof. As shown In FIG. 6B, the second electrode terminal 211 and the first electrode terminal 111 are overlapped through the visual line. As shown in FIGS. 6A and 6B, along the arrow direction 710, the first electrode connection straps 140 are bent between the middle part 146 and the first end 142. Similarly, along the arrow direction 720, the first electrode connection straps 140 are bent between the middle part 146 and the second end 144. The first electrode connection straps 140 are symmetry fold based on the middle part 146 as a center. Meanwhile, along the arrow direction 710 and the arrow direction 720, the second electrode connection straps 240 are also bent to formed a symmetry fold the second electrode connection straps 240.

Referring to FIGS. 7A and 7B, the folded first electrode connection straps 140, from the middle part 146 to the first end 142, include an even number of first bending parts, for example, the first bending part 161 and the first bending part 162, and the first electrode connection straps 140, form the middle part 146 to the second end 144, includes an even number of second bending parts, for example, the second bending part 163 and the second bending part 164. The first bending part 161 and the second bending part 163 are symmetrical to each other, and the first bending part 162 and the second bending part 164 are symmetrical to each other.

In some embodiments, the lithium battery cell manufacturing method further includes the step of laser welding the upper covering plate 114 on the housing 150 to seal the first battery electrode group 120 and the second battery electrode group 130 so as to form the lithium battery cell 100 as illustrated in FIG. 1. The housing 150 is a metal housing, for example, an aluminum housing, to weld to the upper covering plate 114 of the upper cover module 110 by laser welding. Through twice bending processes, the electrode connection straps 140 can be disposed on both sides of the first tab 122. In addition, the required lengths of both sides of the first electrode connection straps 140 are the same through twice bending processes so that the wrinkle on the electrode connection straps can be avoided and the production quality of the lithium battery cell is improved.

Accordingly, the lithium battery cell and manufacturing method thereof can effectively avoid the wrinkle formed on the electrode connection straps, reduce the amount of material of the electrode connection belt, reduce the material inventory in the storage, simplify the manufacturing process and improve the production quality of the lithium battery.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A lithium battery cell, comprising:
an upper cover module having a first electrode terminal;
a first battery electrode group having a first tab and disposed vertically;
a second battery electrode group having a second tab and disposed vertically; and
a plurality of first electrode connection straps,
wherein the first electrode connection straps are stacked together to form a first end, a second end and a middle part and the first electrode connection straps have a same width and length, wherein the first end of the first electrode connection straps is welded to the first tab, the second end of the first electrode connection straps is welded to the second tab, the middle part of the first electrode connection straps is located between the first end and the second end, and the middle part is connected to the first electrode terminal, wherein the first electrode connection straps have an even number of first bending parts from the middle part to the first end, the first electrode connection straps have an even number of second bending parts from the middle part to the second end, and the first bending parts and the second bending parts are symmetrical to each other, wherein the first bending parts comprise a first U-shaped bending part and a second U-shaped bending part, and the first U-shaped bending part is horizontally arranged opposite to the second U-shaped bending part, wherein an opening of the first U-shaped bending part is horizontally arranged opposite to an opening of the second U-shaped bending part, wherein the first U-shaped bending part is disposed on both sides of the first tab, and the second U-shaped bending part is connected to the first U-shaped bending part.

2. The lithium battery cell of claim 1, wherein the upper cover module further comprises:
an upper covering plate;
an upper insulation ring disposed on the upper covering plate; and
a lower insulation ring disposed under the upper covering plate, wherein the upper insulation ring and the lower insulation ring fix the first electrode terminal in the upper covering plate, and electrically isolate the first electrode terminal from the upper covering plate.

3. The lithium battery cell of claim 1, wherein the first electrode terminal is a positive electrode terminal.

4. The lithium battery cell of claim 3, wherein the first electrode connection straps comprise a plurality of aluminum electrode connection straps.

5. The lithium battery cell of claim 1, wherein the first electrode terminal is a negative electrode terminal.

6. The lithium battery cell of claim 5, wherein the first electrode connection straps comprise a plurality of copper electrode connection straps.

7. The lithium battery cell of claim 2, further comprising a housing fixed to the upper covering plate of the upper cover module to seal the first and second battery electrode groups.

8. The lithium battery cell of claim 7, wherein the housing comprises a metal housing laser welded to the upper covering plate of the upper cover module.

9. The lithium battery cell of claim 8, wherein the housing comprises an aluminum housing.

10. A lithium battery cell, comprising:
   an upper cover module having a first electrode terminal;
   a first battery electrode group having a first tab and disposed vertically;
   a second battery electrode group having a second tab and disposed vertically; and
   a plurality of first electrode connection straps,
   wherein the first electrode connection straps are stacked together to form a first end, a second end and a middle part and the first electrode connection straps have a same width and length, wherein the first end of the first electrode connection straps is welded to the first tab, the second end of the first electrode connection straps is welded to the second tab, the middle part of the first electrode connection straps is located between the first end and the second end, and the middle part is connected to the first electrode terminal, wherein the first electrode connection straps have an even number of first bending parts from the middle part to the first end, the first electrode connection straps have an even number of second bending parts from the middle part to the second end, and the first bending parts and the second bending parts are symmetrical to each other, wherein the first bending parts comprise a first U-shaped bending part and a second U-shaped bending part, and the first U-shaped bending part is horizontally arranged opposite to the second U-shaped bending part, wherein an opening of the first U-shaped bending part is horizontally arranged opposite to an opening of the second U-shaped bending part, wherein each of the first U-shaped bending part and the second U-shaped bending part has an apex point and two legs which are substantially parallel to each other, the apex point of the first U-shaped bending part faces a first direction that is parallel to a horizontal direction, the apex point of the second U-shaped bending part faces a second direction which is parallel to the horizontal direction and opposite to the first direction, and the two legs of each of the first and second U-shaped bending parts extend substantially in the horizontal direction.

11. The lithium battery of claim 10, wherein:
   a portion of the first tab, the first end of the first electrode connection straps, another portion of the first tab, and the second U-shaped bending part of the first bending parts are vertically overlapped in this order; and
   a portion of the first U-shaped bending part including the apex point of the first U-shaped bending part and a portion of the middle part of the first electrode connection straps are free of any vertical overlap with the first and second tabs.

\* \* \* \* \*